3,167,392
PREPARATION OF DECABORANE

Lawrence J. Edwards, Zelienople, Pa., and Joseph P. Nigon, Washington, D.C., assignors to Callery Chemical Company, Pittsburgh, Pa., a corporation of Pennsylvania
No Drawing. Filed Feb. 14, 1956, Ser. No. 566,066
8 Claims. (Cl. 23—204)

This invention relates to a method for the preparation of decaborane, $B_{10}H_{14}$. More particularly, it relates to a new and improved method for preparing decarborane by the pyrolysis of diborane in the presence of an inert solvent which results in a substantial increase in yield.

Decaborane was first prepared by Stock and his coworkers in 1913 by the pyrolysis of diborane at 115°–120° C. for 48 hours. Later, Stock prepared decaborane by heating tetraborane at about 90° C. for five hours. The yields of decaborane by both these methods were on the order of about 50 mg. per 100 ml. of diborane or tetraborane used. Decaborane has also been prepared by the decomposition of pentaborane-11 and by exposing $B_4H_{10}$ or $B_2H_6$ to ultra-violet light. In general, none of the previously reported methods of preparing decaborane produce yields high enough to make them worthy of consideration as such for large scale use. In view of the potential usefulness of decaborane as an intermediate in the production of a variety of boron-containing compounds, it was considered desirable to develop a more satisfactory and convenient method of preparing $B_{10}H_{14}$ in higher yields.

One object of this invention is to provide a new and improved method for the preparation of decaborane.

Another object is to provide a convenient and economical method for preparing decaborane in high yield by the pyrolysis of diborane in the presence of a solvent for decaborane such as an isomeric hexane.

Other objects will appear from time to time throughout the following specification and appended claims.

This new and improved method for preparing decaborane will be fully described hereinafter and the novelty thereof will be particularly ponited out and distinctly claimed.

This invention is based upon the discovery that when diborane is pyrolyzed under a pressure of about 280 to 570 p.s.i.g. at moderate temperatures of about 50–100° C. in the presence of a solvent for decaborane, a substantial increase in the yield of decaborane results compared to the same reaction carried out in the absence of a solvent. The exact reason for this unexpected improvement in the yield of decaborane is not entirely known but is undoubtedly due to the greater efficiency of heat transfer in a partially liquid system, the partial pressure of the solvent in the gaseous phase and the inhibition of undesirable reactions which tend to produce solid polymers thereby favoring the formation of decaborane.

The experimental procedure used for carrying out the conversion of diborane to decaborane was as follows: a measured volume of the solvent was placed in a 250 ml. autoclave and a known quantity of diborane under pressure was then introduced. The autoclave was heated at the desired temperature for a definite period of time after which the autoclave was cooled to room temperature and the composition of the reaction products determined. The unreacted diborane was calculated from pressure-volume determinations. The total quantity of volatile liquid boron hydrides produced was measured and the composition determined by mass spectrometer analysis. The decaborane formed was recovered by evaporation of the solvent at room temperature and the solid residue purified by sublimation. The polymeric boron hydride solids were recovered, weighed and analyzed for boron. Most of the experiments were repeated several times to insure a greater degree of reliability of the results and to establish the observed effects with more definite confidence.

The results of one series of experiments in which diborane was pyrolyzed in the presence of 2,3-dimethylbutane at various temperatures and pressures are given in the table below. The yield of decaborane is defined as the percent of diborane consumed which appears as decaborane. In most of these runs, 10 to 20% of the boron from the converted diborane was recovered as tetraborane and pentaborane-9 while 20 to 35% of the consumed diborane was isolated as polymeric solids.

| Run No. | Temp., °C. | Time, Hrs. | $B_2H_6$, p.s.i.g. | Solvent, mls. | Percent $B_2H_6$ Consumed | Percent Yield $B_{10}H_{14}$ |
|---|---|---|---|---|---|---|
| 1 | 100 | 1 | 280 |  | 35 | 9 |
| 2 | 100 | 1 | 280 | 15 | 50 | 30 |
| 3 | 100 | 1 | 280 | 50 | 56 | 29 |
| 4 | 90 | 1 | 280 | 50 | 50 | 43 |
| 5 | 80 | 1 | 280 | 50 | 30 | 32 |
| 6 | 50 | 18 | 280 | 10 | 31 | 31 |

From these results it is readily apparent that a significantly greater yield of decaborane is obtained when the reaction is carried out in the presence of a solvent. The quantity of solvent has little or no effect upon the degree of pyrolysis or the composition of the products. It is also obvious that the pyrolysis proceeds at a much slower rate at 50° C. that at 100° C. The preferred reaction conditions are 280 p.s.i.g. of diborane at 90° C. for one hour. At this temperature, the diborane conversion and decaborane yield were 50% and 43% respectively. At 80° C. both the diborane conversion and the yield of decaborane were lower than at 90° C. but were substantially greater than the yields produced by the pyrolysis of diborane at 80° C. in the absence of a solvent. At 100° C. the conversion of diborane was slightly higher than at 90° C. but the yield of decaborane was lower.

In another experiment, 280 p.s.i.g. of diborane and 50 ml. of 2,3-dimethylbutane were placed in an autoclave and further pressurized to 500 p.s.i.g. with hydrogen. The contents of the autoclave were heated at 90° C. for one hour. It was found upon analysis of the reaction products that the added hydrogen decreased the conversion of diborane from 50% to 28% but increased the yield of decaborane slightly from 43% to 50%. Of significance also was the low yield (5%) of polymeric hydrides obtained compared to the usual 20% to 35% yields in the experiments in which no hydrogen was introduced initially.

In other experiments, diborane was pyrolyzed at 50° C. in the presence of 2,3-dimethylbutane at 400 p.s.i.g. and 570 p.s.i.g. respectively. At these higher pressures, the yield of decaborane was slightly lower than that obtained at 280 p.s.i.g. but was substantially greater than that obtained at the same temperatures and pressures in the absence of a solvent.

In still other experiments, it was found that other saturated hydrocarbons which are inert to both diborane and decaborane could also be used effectively as solvents in the reaction described. Such solvents include the isomeric hexanes, benzene, pentane, and n-hexane which are good solvents for decaborane. The presence of these solvents promotes the decomposition of diborane and results in as much as a five-fold increase in the yield of decaborane compared to the yield of $B_{10}H_{14}$ obtained when no solvent is used.

According to the patent statutes, this invention has been described fully and completely including what is now considered to be one of its best embodiments. However, it will be apparent to those skilled in the art that other variations are possible. Thus, it should be understood that within the scope of the appended claims this invention may be practiced otherwise than as specifically described.

What is claimed and desired to be secured by United States patent is:

1. A method of preparing decaborane which comprises pyrolyzing diborane under pressures from about 280 p.s.i.g. to 570 p.s.i.g. in the presence of a solvent for decaborane which is inert to both diborane and decaborane and separating the decaborane from the reaction products thus formed.

2. A method according to claim 1 in which the solvent is selected from the class consisting of n-hexane, isomeric hexanes, pentane and benzene.

3. A method according to claim 1 in which the solvent is 2,3-dimethylbutane.

4. A method according to claim 1 in which the solvent is n-hexane.

5. A method according to claim 1 in which the solvent is benzene.

6. A method according to claim 1 in which the diborane is pyrolyzed at a temperature from 50° to 100° C.

7. A method according to claim 6 in which the solvent is 2,3-dimethylbutane.

8. A method of preparing decaborane which comprises heating a mixture of diborane and hydrogen in the presence of 2,3-dimethylbutane in an autoclave at a pressure of about 500 p.s.i.g. and a temperature of about 90° C. and recovering the decaborane formed from the reaction products by sublimation.

References Cited in the file of this patent

Hurd: J.A.C.S., vol. 70, pp. 2053–2055 (1948).

Hurd: "Chemistry of the Hydrides," page 87 (1952).

Schlesinger et al.: MDDC 1338, "The Deposition of Pure Boron, Part I," pages 2, 3, 19. May 24, 1944, declass. September 19, 1947.

Schechter et al.: "Boron Hydrides and Related Compounds," vol. I, pages 11, 13, 26, and 37. January 8, 1951, declassified January 5, 1954. Dept. of the Navy, Bureau of Aeronautics.

Schechter et al.: "Preparation of Pentaborane and the Evaluation of the Hazards of Handling Diborane and Pentaborane," Report No. MSA–9973–FR., Navy Contract NOa(s) 9973, pages 4, 5, 7. December 1, 1950, declassified May 11, 1954, Bureau of Aeronautics, Dept. of the Navy.